United States Patent
Wang et al.

(10) Patent No.: US 11,938,589 B2
(45) Date of Patent: Mar. 26, 2024

(54) DRY ICE CLEANING AND RECYCLING DEVICE AND METHOD FOR CONNECTING ROD

(71) Applicant: GUANGDONG UNIVERSITY OF TECHNOLOGY, Guangzhou (CN)

(72) Inventors: Guan Wang, Guangzhou (CN); Guohua Chen, Guangzhou (CN); Sihao Lin, Guangzhou (CN); Junxian Li, Guangzhou (CN); Jieyu Zhu, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/949,165

(22) Filed: Sep. 20, 2022

(65) Prior Publication Data

US 2023/0294242 A1    Sep. 21, 2023

(30) Foreign Application Priority Data

Mar. 15, 2022   (CN) .......................... 202210254224.X (51) Int. Cl.
  *B24C 1/00*         (2006.01)
  *B08B 7/00*         (2006.01)
  (Continued)

(52) U.S. Cl.
  CPC ............ *B24C 1/003* (2013.01); *B08B 7/0014* (2013.01); *B08B 7/0092* (2013.01); *B08B 9/087* (2013.01);
  (Continued)

(58) Field of Classification Search
  CPC ... B08B 13/00; B08B 2209/08; B08B 7/0014; B08B 7/0092; B08B 9/087; B08B 3/006;
  (Continued)

(56) References Cited

U.S. PATENT DOCUMENTS 5,123,207 A * 6/1992 Gillis, Jr. .................. B24C 9/00
                                                        451/92
5,836,809 A * 11/1998 Kosic ...................... B24C 1/003
                                                        451/38

FOREIGN PATENT DOCUMENTS

CN       105772289 A *  7/2016
CN       112474606 A    3/2021
(Continued)

OTHER PUBLICATIONS

WO2021/196423A1 machine translation (Year: 2021).*
CN105772289A machine translation (Year: 2016).*
JP3107460U machine translation (Year: 2005).*

*Primary Examiner* — Douglas Lee (57) ABSTRACT

Disclosed are a dry ice cleaning and recycling device and a method a connecting rod. The device includes a dry ice ejector module, a clamping module, and a box, and the dry ice ejector module and the clamp module are both arranged in the box; the dry ice ejector module includes a spray gun guide rail and a cleaning nozzle vertically and slidably connected to the spray gun guide rail; and the clamp module includes a clamp guide rail and a clamp horizontally and slidably connected to the clamp guide rail. The device further includes a dry ice recycling device, the dry ice recycling device includes a dry ice recycling collector and a condenser pipe, and two ends of the condenser pipe are communicated with the box and the dry ice recycling collector respectively.

9 Claims, 5 Drawing Sheets

(51) Int. Cl.
    *B08B 9/087*       (2006.01)
    *B08B 13/00*       (2006.01)
    *B24C 9/00*        (2006.01)
    *G01N 23/046*     (2018.01)

(52) U.S. Cl.
    CPC ............... *B08B 13/00* (2013.01); *B24C 9/00* (2013.01); *G01N 23/046* (2013.01); *B08B 2209/08* (2013.01); *G01N 2223/633* (2013.01); *G01N 2223/635* (2013.01); *G01N 2223/639* (2013.01)

(58) Field of Classification Search
    CPC ........... B24C 1/003; B24C 1/086; B24C 9/00; G01N 2223/633; G01N 2223/635; G01N 2223/639; G01N 23/046
    See application file for complete search history.

(56) References Cited

FOREIGN PATENT DOCUMENTS

| | | | | |
|---|---|---|---|---|
| CN | 113426791 A | 9/2021 | | |
| CN | 217141547 U | 8/2022 | | |
| JP | 3107460 U | * | 2/2005 | |
| WO | WO-2021196423 A1 | * | 10/2021 | ............. B08B 13/00 |

* cited by examiner

DRY ICE CLEANING AND RECYCLING DEVICE AND METHOD FOR CONNECTING ROD

CROSS REFERENCE TO RELATED APPLICATIONS

This application claims foreign priority of Chinese Patent Application No. 202210254224.X, filed on Mar. 15, 2022 in the China National Intellectual Property Administration, the disclosures of all of which are hereby incorporated by reference.

TECHNICAL FIELD

The present invention belongs to the technical field of cleaning equipment, specifically relates to a dry ice cleaning and recycling device and method for a connecting rod, and particularly relates to a dry ice cleaning and recycling device and method for the machined automobile connecting rod.

BACKGROUND

In a dry ice cleaning technology, compressed air is used as power and a carrier, and particles of dry ice are used as accelerated particles, which are sprayed onto a surface of a cleaned object through a special jet cleaner, so that dirt, oil stains and residual impurities on the surface of the cleaned object are quickly frozen by using energy conversion such as momentum change, sublimation, and melting of solid particles of dry ice moving at a high speed, then condensed, embrittled and peeled off, and removed along with an airflow at the same time, without causing any damage to the surface of the cleaned object, especially to a metal surface, and affecting the cleanliness of the metal surface. Workpieces such as an automobile connecting rod may be cleaned, and a specific cleaning process includes: low-temperature freezing peeling, purging peeling, and impact peeling, wherein the impurities may be frozen and embrittled to be easily peeled off when the dry ice is sprayed on the workpieces, and meanwhile, the frozen impurities may be peeled off by impact and purging of the dry ice.

The automobile connecting rod needs to be cleaned after machining, and secondary cleaning needs to be carried out if the cleaning fails to meet a cleanliness requirement, which can greatly reduce the cleaning efficiency of the automobile connecting rod, increase cleaning costs and cause economic losses to enterprises. The cleanliness requirement for the cleaning of the automobile connecting rod mainly comprises a maximum size of metal particles and an impurity quality of the connecting rod. In the field of connecting rod cleaning, it is difficult in the industry to clean metal impurities in a small-head hole bushing interlayer gap. An existing cleaning technology of the automobile connecting rod has the following defects and disadvantages:

1. a traditional cleaning device and method are relatively simple, in which manual high-pressure spraying is mostly used to clean the connecting rod, with a loud noise during cleaning and volatilization of chemicals in a cleaning solution, which endangers the health of staffs and a large amount of cleaning solution is used with severe waste, which does not conform to the concept of green industry;
2. an existing ultrasonic cleaning method has a loud noise during cleaning, and quick ultrasonic energy attenuation, resulting in a weak cleaning strength, which cannot achieve a good cleaning effect on the small-head hole bushing gap, thus having a poor cleaning effect; and
3. an existing cleaning device neglects an influence of a placement angle of the connecting rod on the cleaning effect during cleaning so that it is difficult to clean metal contained in a small-head hole bushing of the automobile connecting rod, and an improper placement angle of the automobile connecting rod, such as vertical jet washing by a high-pressure water flow, may even allow the metal impurities after cleaning to be more firmly contained in the deep gap, which cannot meet the increasingly strict cleanliness requirement of the connecting rod.

SUMMARY

The present invention provides a dry ice cleaning and recycling device and method for a connecting rod aiming at the above problems in the prior art, a dry ice cleaning technology is utilized to remove impurities and oil stains attached to the connecting rod during machining, and separated carbon dioxide is recycled by a recycling device for dry ice cleaning, thus effectively reducing cleaning costs and carbon dioxide emission; and in addition, special cleaning may be carried out on a small-head hole bushing gap of the connecting rod which is difficult to clean, so that a cleaning effect is good and may meet a cleanliness requirement, and an operation is efficient and convenient, energy-saving and environment-friendly, and low in cost.

To achieve the technical object above, the following technical solutions are used in the present invention.

A dry ice cleaning and recycling device for a connecting rod comprises a dry ice ejector module, a clamping module, and a box, and the dry ice ejector module and the clamp module are both arranged in the box, wherein, the dry ice ejector module comprises a spray gun guide rail and a cleaning nozzle vertically and slidably connected to the spray gun guide rail, and the clamp module comprises a clamp guide rail and a clamp horizontally and slidably connected to the clamp guide rail; and a dry ice recycling device is further comprised, wherein the dry ice recycling device comprises a dry ice recycling collector and a condenser pipe, and two ends of the condenser pipe are communicated with the box and the dry ice recycling collector respectively.

Further, the dry ice ejector module is provided with a plurality of spray gun guide rails and a plurality of cleaning nozzles, the plurality of spray gun guide rails are vertically arranged side by side, and the plurality of cleaning nozzles are fixedly connected to a horizontal connecting rod at intervals, and the horizontal connecting rod is slidably connected to the plurality of spray gun guide rails; and the cleaning nozzles are externally connected to a dry ice supply device.

Further, two dry ice ejector modules are provided, and respectively arranged on two sides of the clamp module; the cleaning nozzles of the two dry ice ejector modules are all inclined downwardly at an angle of 30 degrees to 50 degrees with a horizontal plane, and a crumb tray is arranged at a bottom portion of the box.

Further, the clamp guide rail of the clamp module is horizontally arranged; an upper end of the clamp is slidably connected below the clamp guide rail through a vertical connecting rod, and the clamp is provided with a big-head horizontal bar clamp close to the upper end and a small-head horizontal bar clamp close to a lower end, and the clamp is capable of positioning and placing a plurality of connecting rods at the same time through the big-head horizontal bar clamp and the small-head horizontal bar clamp.

Further, the dry ice recycling collector has a cylindrical structure, and comprises a condenser wall, an annular scraper, and a stirring device; the annular scraper is arranged at a top portion of the condenser wall and externally connected to a scraper driving motor, and the scraper driving motor is capable of driving the annular scraper to move up and down along the condenser wall, and the stirring device is arranged at a bottom portion of the condenser wall and externally connected to a stirring motor, and the stirring motor is capable of driving the stirring device to rotate and stir.

Further, a constant-temperature pipe sleeve is sheathed outside the condenser pipe; and a constant-temperature sleeve is arranged at a periphery of the condenser wall.

Further, the annular scraper is externally connected to an X-ray photogrammetry system and used for monitoring the thickness of dry ice on the condenser wall; and the stirring device is also externally connected to the X-ray photogrammetry system, and used for monitoring the thickness of dry ice and granularity of dry ice at the stirring device; and the X-ray photogrammetry system comprises a high-voltage generator, an X-ray source assembly, an image detector, and an image processing end; the processing end is located inside a PC end of a control assembly, and the X-ray source assembly is used in a scanning device, and the image detector is used for collecting an image and uploading the image to the PC end for image processing and analysis, to obtain a thickness of dry ice to be detected.

In addition, the present invention further provides a dry ice cleaning and recycling method for a connecting rod, using the dry ice cleaning and recycling device for the connecting rod above, wherein the dry ice cleaning and recycling device for the connecting rod comprises the PC end of the control assembly, and the method specifically comprises the following steps of:

step S01: vertically placing the plurality of connecting rods in the clamp, clamping big-head ends of the connecting rods through the big-head horizontal bar clamp, and clamping small-head ends of the connecting rods through the small-head horizontal bar clamp, so that the connecting rods are fixed;

step S02: starting and cooperatively controlling the operation of the following components in sequence by the PC end:

starting the dry ice ejector modules on two sides of the clamp module, and carrying out dry ice cleaning on the connecting rods on the clamp by the cleaning nozzles inclined downwardly at the angle of 30 degrees to 50 degrees with the horizontal plane;

starting a nozzle motor to drive the cleaning nozzles to vertically reciprocate on the spray gun guide rail along a Z-axis direction;

starting a clamp motor to drive the clamp to horizontally reciprocate on the clamp guide rail along a Y-axis direction; and starting the dry ice recycling device and the X-ray photogrammetry system to monitor the thicknesses of dry ice at the condenser wall and the stirring device in (real-time), feeding back monitoring signals to the PC end and controlling the annular scraper and the stirring device to operate by the PC end to recycle the dry ice; and step S03: shutting down the dry ice ejector module, the nozzle motor, the clamp motor, the dry ice recycling device, and the X-ray photogrammetry system in sequence after cleaning; and removing the connecting rods, so that one cleaning process is completed.

Further, the X-ray photogrammetry system comprises the high-voltage generator, the X-ray source assembly, the image detector, and the image processing end; the processing end is located inside the PC end of the control assembly, and the X-ray source assembly is used in the scanning device, and the image detector is used for collecting an image and uploading the image to the PC end for image processing and analysis, to obtain the thickness of dry ice to be detected.

Further, in step S02, controlling the annular scraper and the stirring device to operate by the PC end to recycle the dry ice specifically comprises:

externally connecting the annular scraper to the scraper driving motor, and setting a high-power working condition and a low-power working condition for the scraper driving motor, wherein a power of the high-power working condition is 500 W to 600 W, and a power of the low-power working condition is 200 W to 300 W;

controlling the annular scraper to cooperatively operate with the externally connected X-ray photogrammetry system by the PC end, which specifically comprises:

sensing that the nozzle motor is operating by the PC end during cleaning, when the X-ray photogrammetry system monitors that the thickness of dry ice on the condenser wall is greater than and equal to 4 mm, outputting a feedback signal B to the PC end, and controlling the scraper driving motor to drive the annular scraper to scrape the dry ice in the high-power working condition, thus cleaning the dry ice attached to the condenser wall; and sensing that operation of the nozzle motor is ended by the PC end after cleaning, when the X-ray photogrammetry system monitors that the thickness of dry ice is greater than and equal to 2 mm, outputting a feedback signal S to the PC end, and controlling the scraper driving motor to drive the annular scraper to scrape the dry ice in the low-power working condition; and controlling the stirring device to cooperatively operate with the externally connected X-ray photogrammetry system by the PC end, which specifically comprises:

when the X-ray photogrammetry system monitors that the thickness of dry ice at the stirring device is greater than and equal to 50 mm, outputting a feedback signal F to the PC end, controlling the stirring motor to drive the stirring device to stir automatically by the PC end, reducing a diameter of particles of the dry ice to 0.5 mm to 2 mm under the monitoring of the X-ray photogrammetry system, and when the operation of the stirring device is stopped, taking out the particles of the dry ice from the bottom portion of the dry ice recycling device for recycling.

Compared with the prior art, the present invention has the following beneficial effects:

Compared with the prior art, the present invention has the following beneficial effects:

(1) according to the dry ice cleaning and recycling device for the connecting rod provided by the present invention, the dry ice cleaning is carried out through the dry ice ejector modules arranged on two sides of the clamp module, each dry ice ejector module is provided with a plurality of cleaning nozzles corresponding to a plurality of workpieces on the clamp module, the plurality of cleaning nozzles are driven by a single nozzle motor to reciprocate up and down along the spray gun guide rail during cleaning, the plurality of workpieces are controlled by a single clamp motor to reciprocate horizontally along the clamp guide rail, the dry ice ejector modules on two sides are cooperatively operated with the clamp module in a middle position, so that the plurality of workpieces may be cleaned in a batch once, and each workpiece may be fully and comprehensively cleaned, and meanwhile, frozen and condensed impurities on the workpieces are effectively peeled off during purging of the cleaning nozzles and reciprocating vibration of the clamp, thus having high cleaning efficiency, a good cleaning effect, a simplified number of motors, energy conservation and efficiency, and a simple and reliable mechanism;

(2) in order to prevent an existing cleaning device from neglecting an influence of a placement angle of the connecting rod on the cleaning effect during cleaning, so that it is difficult to clean metal contained in a small-head hole bushing of an automobile connecting rod, and even cleaned metal impurities are more firmly contained in a deep gap (such as vertical jet washing with high-pressure water flow), the present invention provides the dry ice cleaning and recycling device for the connecting rod, the cleaning nozzles of the two dry ice ejector modules on two sides are inclined downwardly at the angle of 30 degrees to 50 degrees with the horizontal plane, under this inclined angle, and combined with characteristics of the dry ice cleaning and horizontal reciprocating vibration of the clamp, particles may be better separated from the gap of the workpiece, and small-head hole bushing gap interlayers of the connecting rods may be more effectively and specially cleaned, so as to meet increasingly strict cleanliness requirements of the connecting rods;

(3) according to the dry ice cleaning and recycling device for the connecting rod provided by the present invention, the plurality of connecting rods are simultaneously cleaned in a batch once inside the box by the dry ice cleaning technology, and the dry ice after cleaning is recycled by the dry ice recycling device, so that manual operations are reduced in the whole process, a cleaning effect can be ensured, cleaning efficiency is improved, traditional cleaning liquid pollution is avoided, and the device is safe and environment-friendly, and can achieve an energy-saving effect by recycling the dry ice; and (4) according to the dry ice cleaning and recycling device for the connecting rod provided by the present invention, the X-ray photogrammetry system is arranged in the dry ice recycling system, monitors the thicknesses of dry ice on the condenser wall, and the stirring device in real time, and feeds back the monitoring signals to the PC end, the PC end controls the annular scraper and the stirring device to carry out dry ice scrapping and stirring intermittently under a condition of meeting a certain thickness of the dry ice, and the annular scraper may operate under different power according to different thicknesses of dry ice, which can not only efficiently recycle the dry ice but also save electric energy so that the device has a simple and easily implemented control logic and a remarkable energy saving effect.

Descriptions of reference numerals: 1 refers to spray gun guide rail; 2 refers to cleaning nozzle; 201 refers to the horizontal connecting rod; 3 refers to crumb tray; 4 refers to box; 5 refers to clamp guide rail; 6 refers to clamp; 601 refers to the vertical connecting rod; 602 refers to big-head horizontal bar clamp; 603 refers to small-head horizontal bar clamp; 7 refers to condenser pipe; 71 refers to condenser pipe orifice; 8 refers to constant-temperature pipe sleeve; 9 refers to annular ice scraper; 10 refers to dry ice recycling collector; 11 refers to condenser wall; 12 refers to constant-temperature sleeve; 13 refers to stirring device, and 14 refers to connecting rod.

DETAILED DESCRIPTION

The technical solutions in the embodiments of the present invention are clearly and completely described concerning the accompanying drawings in the embodiments of the present invention. The described embodiments are only some but not all of the embodiments of the present invention. Based on the embodiments in the present invention, all other embodiments obtained by those of ordinary skills in the art without going through any creative work should fall within the scope of protection of the present invention.

In the description of the present invention, it should be understood that the orientation or position relationship is indicated by the terms "coaxial", "bottom", "one end", "top", "middle", "the other end", "up", "one side", "top", "inside", "front", "center", "two ends", and the like is based on the orientation or position relationship shown in the accompanying drawings, it is only for the convenience of description of the utility model and simplification of the description, and it is not to indicate or imply that the indicated device or element must have a specific orientation, and be constructed and operated in a specific orientation. Therefore, the terms should not be understood as limiting the utility model.

In the utility model, the terms "installation", "setting", "connection", "fixation", "rotary connection", and the like should be understood in a broad sense unless otherwise specified and defined. For example, they may be a fixed connection, removable connection, or integrated connection; may be a mechanical connection or electrical connection, and may be (a direct) connection, or an indirect connection through an intermediate medium, and connection inside two components, or interaction relation of two elements. Unless otherwise explicitly defined, the specific meanings of the above terms in the present invention may be understood by those of ordinary skills in the art according to specific situations.

Embodiment 1

Concerning FIG. 1 to FIG. 7, the present invention provides a dry ice cleaning and recycling device for a connecting rod, which mainly comprises a box 4, a dry ice ejector module and a clamping module arranged inside box 4, and a dry ice recycling device connected outside the box 4.

Two dry ice ejector modules are provided and arranged on the left and right sides of the clamp module respectively. Concerning FIG. 4, each dry ice ejector module comprises three spray gun guide rails 1 vertically arranged side by side, and three cleaning nozzles 2 arranged on the spray gun guide rails 1 at intervals. The three cleaning nozzles 2 are fixedly connected to a horizontal connecting rod 201 at intervals, and the horizontal connecting rod 201 is arranged on the three spray gun guide rails 1, and is capable of reciprocating up and down along a Z-axis of the spray gun guide rails 1 under control of a single nozzle motor (not shown in the drawings). The cleaning nozzles 2 are inclined downwardly at an angle of 30 degrees to 50 degrees with a horizontal plane, and externally connected to a dry ice supply device. A crumb tray 3 is arranged at the bottom portion of box 4 and used for receiving impurities dropping during cleaning.

Figure 1:
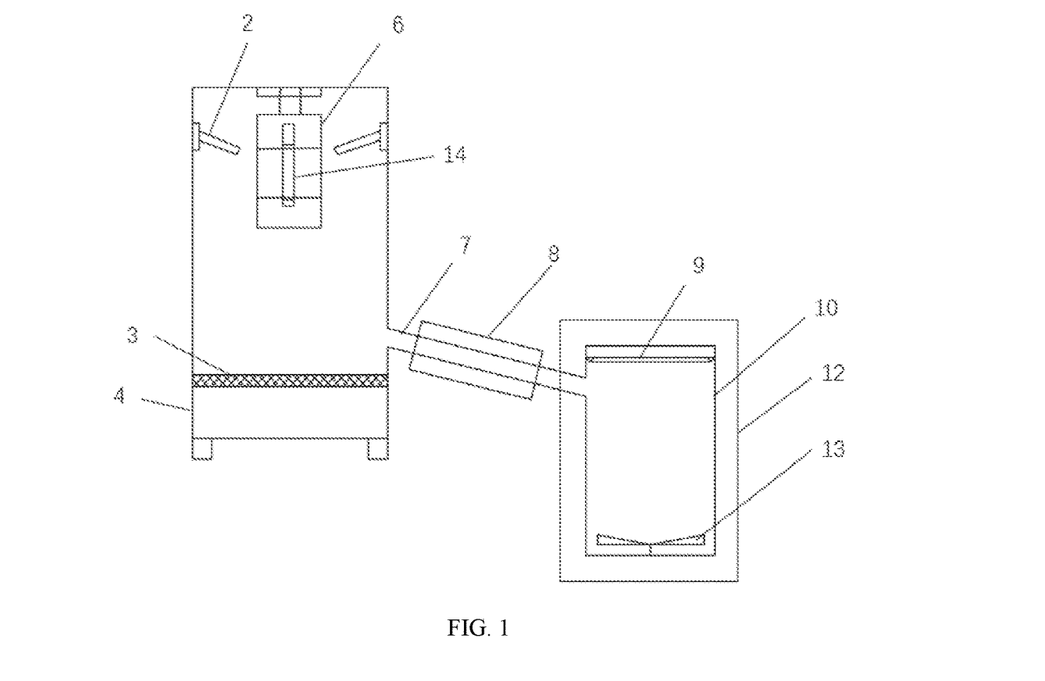
FIG. 1 is a schematic diagram of an overall structure of a dry ice cleaning and recycling device for a connecting rod in Embodiment 1 of the present invention.
Figure 2:
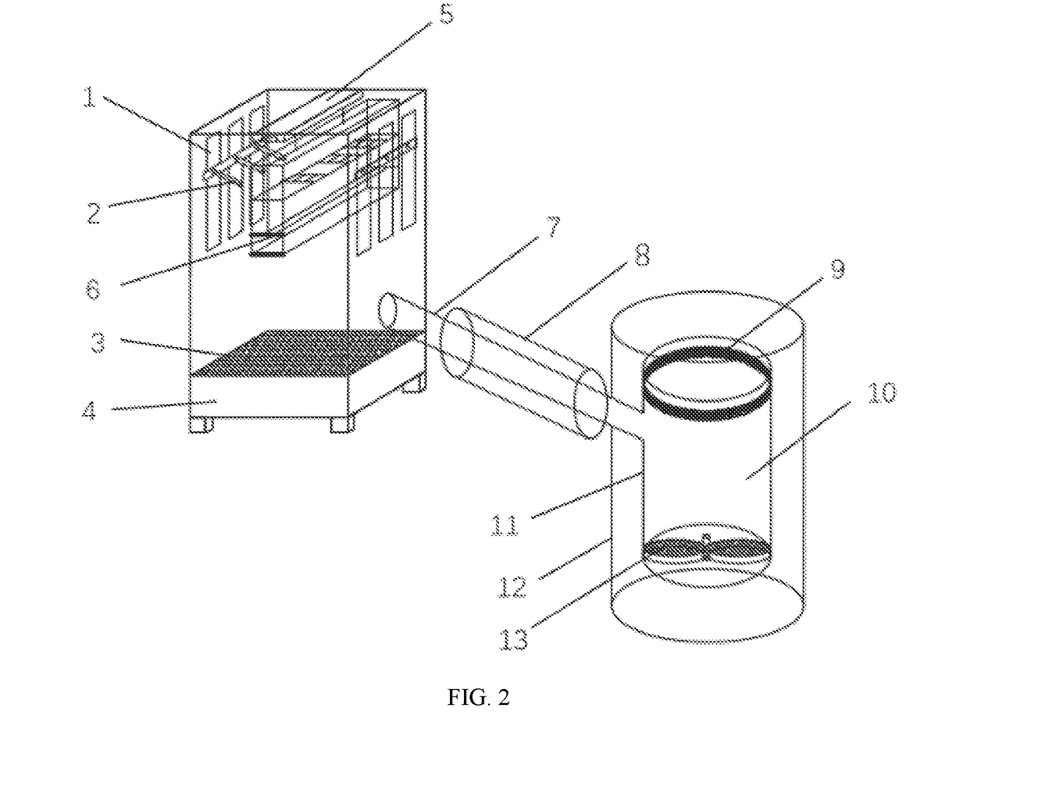
FIG. 2 is a perspective view of the overall structure of the dry ice cleaning and recycling device for the connecting rod in Embodiment 1 of the present invention.
Figure 3:
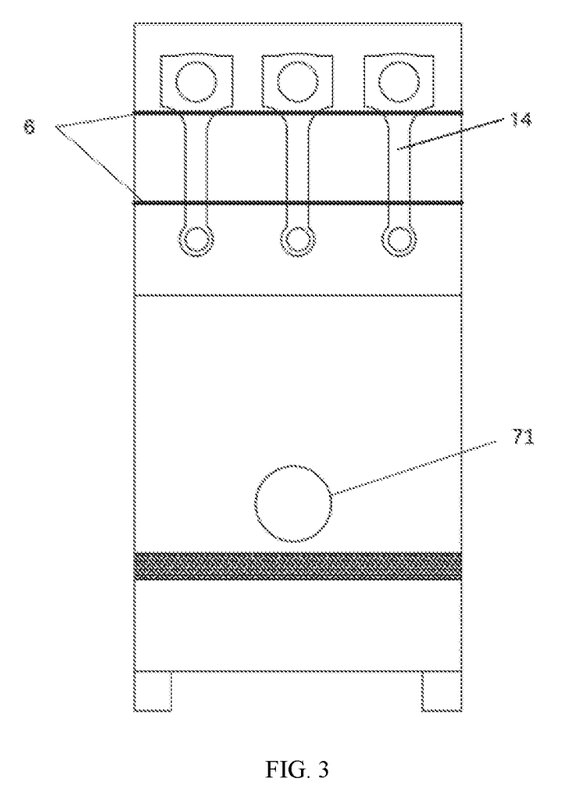
FIG. 3 is a schematic diagram of a local side-view structure in Embodiment 1 of the present invention, which is specifically a cooperative structure of a box, a clamp, and a connecting rod.
Figure 4:
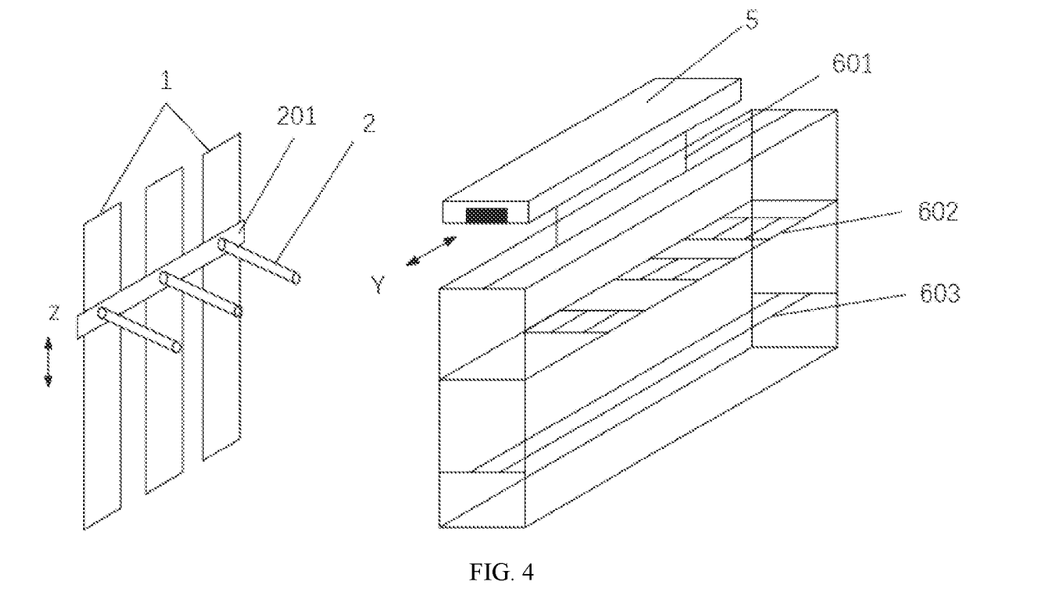
FIG. 4 is a schematic diagram of a local structure in Embodiment 1 of the present invention, which is specifically a structure of a dry ice ejector module on a single side and a clamping module in cooperative operation.

The clamping module comprises a clamp guide rail 5 and a clamp 6. The clamp guide rail 5 is horizontally arranged. An upper end of the clamp 6 is slidably connected below the clamp guide rail 5 through a vertical connecting rod 601, and the clamp is capable of reciprocating horizontally along a Y-axis of the clamp guide rail 5 under the control of a single clamp motor (not shown in the drawings). Clamp 6 is provided with a big-head horizontal bar clamp 602 close to the upper end and a small-head horizontal bar clamp 603 close to the lower end. The clamp 6 is capable of positioning and placing three connecting rods 14 at the same time through the big-head horizontal bar clamp 602 and the small-head horizontal bar clamp 603.

Figure 5:
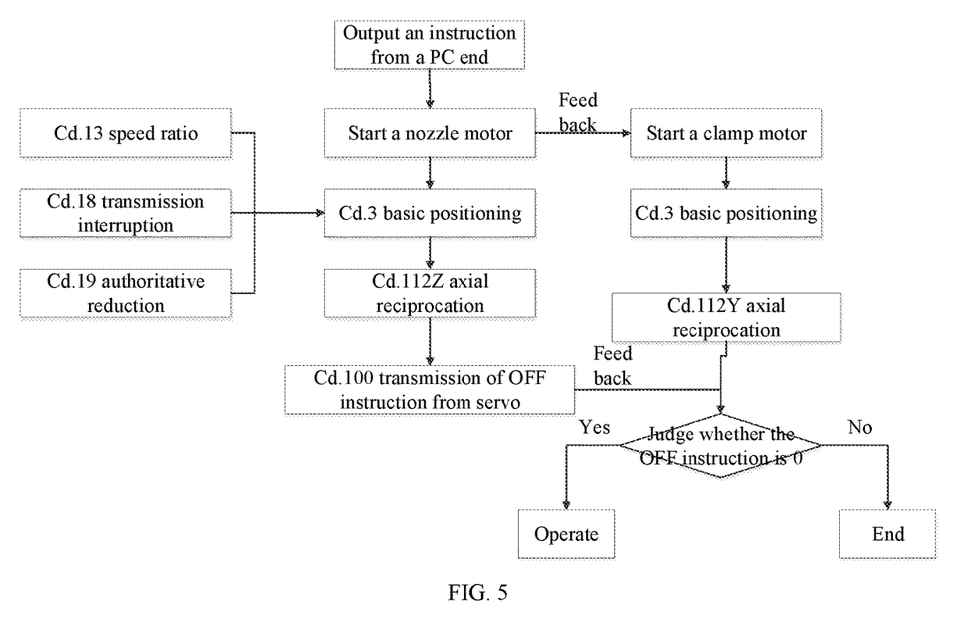
FIG. 5 is a flow chart of a control logic of the cooperative operation of the dry ice ejector module and the clamp module in Embodiment 1 of the present invention.

FIG. 5 is a flow chart of control logic in the operation of the dry ice ejector module and the clamp module, wherein Cd . . . X is a control instruction of a motion controller, and the following words indicate a specific meaning of the instruction.

In a dry ice cleaning process, the three connecting rods 14 on the clamp 6 are cleaned through three cleaning nozzles 2 in left and right rows inclined downwardly at the angle of 30 degrees to 50 degrees with the horizontal plane, and particles may be better removed from a gap of a workpiece at the inclination angle within this range, so that small-head hole bushing gap interlayers of the connecting rods are cleaned more effectively. Meanwhile, the three cleaning nozzles 2 on two sides are driven by the single nozzle motor to reciprocate up and down along the Z-axis direction during cleaning, so that the connecting rods may be completely cleaned. Three connecting rods 14 in a middle position are driven by the single clamp motor to reciprocate horizontally along the Y-axis direction, so that condensed impurities may be effectively peeled off during purging and reciprocating vibration of the cleaning nozzles, and the three connecting rods may be cleaned in a batch once, thus having the advantages of good cleaning effect, comprehensive cleaning, high cleaning efficiency, simplified number of motors, energy saving and high efficiency.

In addition, in some other embodiments, several connecting rods cleaned once and a length of the corresponding clamp, and several cleaning nozzles may be adjusted according to needs, thus adjusting and changing (the size) and a cleaning efficiency of the device.

Figure 6:
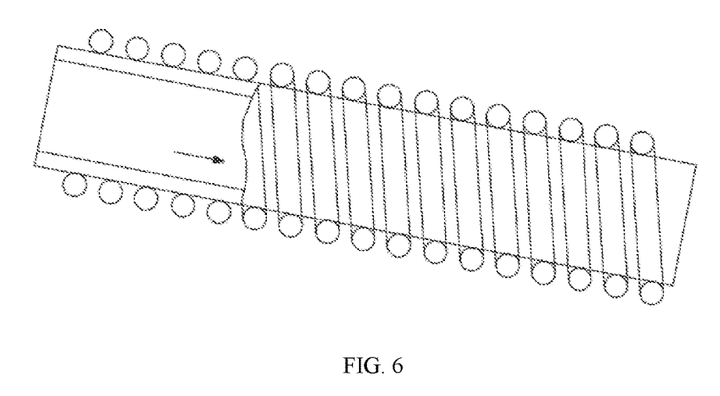
FIG. 6 is a schematic diagram of a local perspective structure of a condenser pipe in Embodiment 1 of the present invention.
Figure 7:
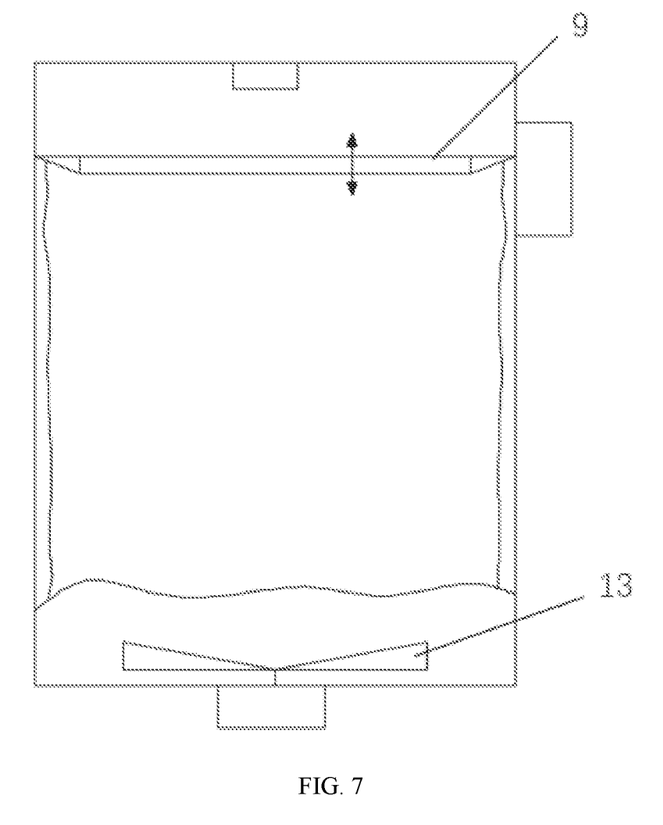
FIG. 7 is a schematic structural diagram of a dry ice recycling collector in Embodiment 1 of the present invention.

The dry ice recycling device comprises a dry ice recycling collector 10 and a condenser pipe 7, wherein an upper end of the condenser pipe 7 is communicated with the box 4 through a condenser pipe opening 71, and a lower end of the condenser pipe is integrally communicated with the dry ice recycling collector 10. The dry ice recycling collector 10 has a cylindrical structure and comprises a condenser wall 11, an annular scraper 9, and a stirring device 13. The annular scraper 9 is arranged at a top portion of the condenser wall 11 and externally connected to a scraper driving motor, and the scraper driving motor is capable of driving the annular scraper 9 to move up and down along the condenser wall 11. The stirring device 13 is arranged at a bottom portion of the condenser wall 11 and externally connected to a stirring motor, and the stirring motor is capable of driving the stirring device 13 to rotate and stir. A constant-temperature pipe sleeve 8 is sheathed outside condenser pipe 7, which may prevent condenser pipe 7 from exchanging heat with the outside to ensure a constant condensation temperature of condenser pipe 7. A constant-temperature sleeve 12 is arranged outside the dry ice recycling collector 10, which may prevent the dry ice recycling collector 10 from exchanging heat with the outside to ensure a constant condensation temperature of the dry ice recycling collector 10.

In a dry ice recycling process: the dry ice is sublimated into carbon dioxide gas after being used for cleaning the connecting rod 14, with an increased volume, thus entering the condensation pipe 7 under a pressure. A temperature in the condensation pipe 7 is −40° C. under an action of a refrigerator, and since a liquefaction temperature of the carbon dioxide is −37° C., most of the carbon dioxide is liquefied when passing through the condensation pipe 7, and flows into the dry ice recycling collector 10 along a pipeline. The collector is surrounded by the condenser wall 11, a temperature of a wall surface may be −80° C., and a solidification temperature of the liquid carbon dioxide is −78.45° C., so that the liquid carbon dioxide may form granular dry ice when flowing through or being contacted with the condenser wall 11 to be attached to the condenser wall 11. The annular scraper 9 at the upper end of the condenser wall 11 may scrape off the dry ice from top to bottom along the condenser wall 11. Meanwhile, the stirring device 13 at the bottom portion of the condenser wall 11 may break the dry ice by stirring, so that the diameter of particles of the dry ice is reduced to 0.5 mm to 2 mm, and when the operation of a stirring blade of the stirring device is stopped, the particles of the dry ice will be taken out and directly recycled for cleaning the connecting rod.

Embodiment 2

The following improvements are made in the embodiment based on Embodiment 1.

The dry ice cleaning and recycling device for the connecting rod comprises a PC end of a control assembly.

The annular scraper 9 is externally connected to an X-ray photogrammetry system and used for monitoring the thickness of dry ice on the condenser wall 11. The stirring device 13 is externally connected to the X-ray photogrammetry system and used for monitoring the thickness of dry ice and the granularity of dry ice in the stirring device 13. The X-ray photogrammetry system feeds back monitoring signals to the PC end, and the PC end controls the annular scraper 9 and the stirring device 13 to carry out dry ice scrapping and stirring intermittently under a condition of meeting a certain thickness of the dry ice, which can not only efficiently recycle the dry ice but also save electric energy.

Figure 8:
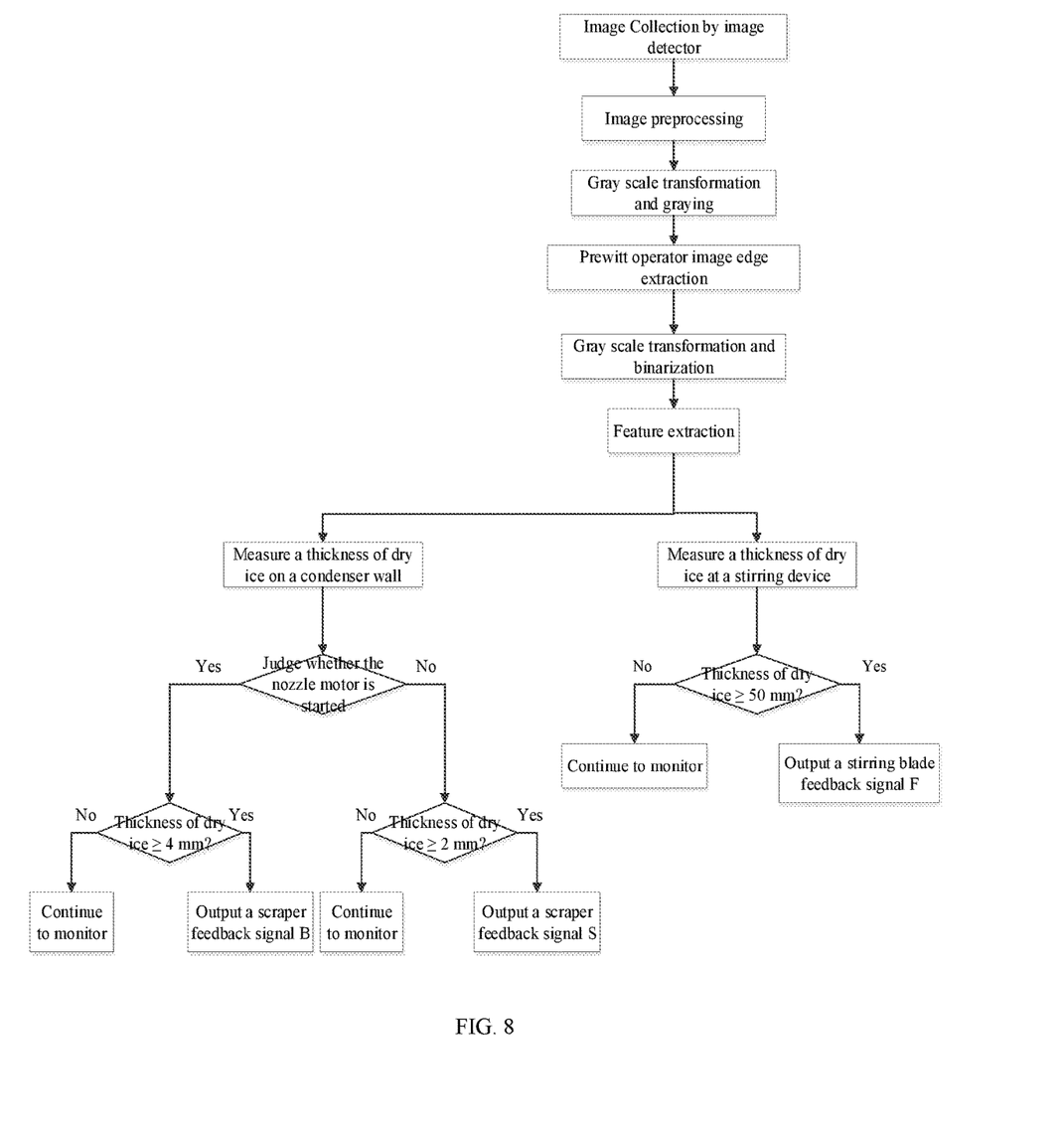
FIG. 8 is a workflow chart of an X-ray photogrammetry system in Embodiment 3 of the present invention.

Specifically, concerning a workflow chart of the X-ray photogrammetry system shown in FIG. 8, the X-ray photogrammetry system comprises a high-voltage generator, an X-ray source assembly, an image detector, and an image processing end. The processing end is located inside a PC end of a control assembly. The X-ray source assembly is used in a scanning device, and the image detector is used for collecting an image and uploading the image to the PC end for image processing and analysis, to obtain a thickness of dry ice to be detected by image preprocessing, grayscale transformation-graying, Prewitt operator image edge extraction, grayscale transformation-binarization, feature extraction, and other methods, and the PC end cooperatively controls the scraper driving motor and the stirring motor to operate.

A high-power working condition and a low-power working condition are set for the scraper driving motor, wherein the power of the high-power working condition is 500 W to 600 W, and the power of the low-power working condition is 200 W to 300 W.

The PC end controls the annular scraper 9 to cooperatively operate with the externally connected X-ray photogrammetry system, which specifically comprises:

sensing that the nozzle motor is operating by the PC end during cleaning, with a large amount of carbon dioxide and a fast speed of condensation of dry ice when the X-ray photogrammetry system monitors that the thickness of dry ice on the condenser wall 11 is greater than and equal to 4 mm, outputting a feedback signal B to the PC end, and controlling the scraper driving motor to drive the annular scraper 9 to scrape the dry ice in the high-power working condition, thus cleaning the dry ice attached to the condenser wall 11; and sensing that operation of the nozzle motor is ended by the PC end after cleaning, with a reduced amount of carbon dioxide and a reduced speed of condensation of dry ice, when the X-ray photogrammetry system monitors that the thickness of dry ice is greater than and equal to 2 mm, outputting a feedback signal S to the PC end, and controlling the scraper driving motor to drive the annular scraper 9 to scrape the dry ice in the low-power working condition; and controlling the stirring device 13 to cooperatively operate with the externally connected X-ray photogrammetry system by the PC end, which specifically comprises:

when the X-ray photogrammetry system monitors that the thickness of dry ice at the stirring device 13 is greater than and equal to 50 mm, outputting a feedback signal F to the PC end, controlling the stirring motor to drive the stirring device 13 to stir automatically, reducing a diameter of particles of the dry ice to 0.5 mm to 2 mm under the monitoring of the X-ray photogrammetry system, and when the operation of the stirring blade of the stirring device is stopped, taking out the particles of the dry ice from the bottom portion of the dry ice recycling device for recycling.

Embodiment 3

A dry ice cleaning and recycling method for a connecting rod, using the dry ice cleaning and recycling device for the connecting rod in Embodiment 2 are provided, and the method specifically comprises the following steps:

step S01: vertically placing three connecting rods 14 in the clamp 6, clamping big-head ends of the connecting rods through the big-head horizontal bar clamp 602, and clamping small-head ends of the connecting rods through the small-head horizontal bar clamp 603, so that the connecting rods 14 are fixed;

step S02: starting and cooperatively controlling the operation of the following components in sequence by the PC end:

starting the dry ice ejector modules on two sides of the clamp module, and carrying out dry ice cleaning on the connecting rods 14 on the clamp 6 by the cleaning nozzles 2 at an inclined angle of 45 degrees with a horizontal plane;

starting a nozzle motor to drive the cleaning nozzles 2 to vertically reciprocate on the spray gun guide rail 1 along a Z-axis direction;

starting a clamp motor to drive the clamp 6 to horizontally reciprocate on the clamp guide rail 5 along a Y-axis direction; and starting a nozzle motor to drive the cleaning nozzles 2 to vertically reciprocate on the spray gun guide rail 1 along a Z-axis direction;

starting a clamp motor to drive the clamp 6 to horizontally reciprocate on the clamp guide rail 5 along a Y-axis direction; and starting the dry ice recycling device and the X-ray photogrammetry system to monitor the thicknesses of dry ice at the condenser wall 11 and the stirring device 13 in real time, feeding back monitoring signals to the PC end and controlling the annular scraper 9 and the stirring device 13 to operate by the PC end to recycle the dry ice; and step S03: shutting down the dry ice ejector module, the nozzle motor, the clamp motor, the dry ice recycling device, and the X-ray photogrammetry system in sequence after cleaning; and removing the connecting rods 14, so that one cleaning process is completed.

In the cleaning method above, the X-ray photogrammetry system comprises a high-voltage generator, an X-ray source assembly, an image detector, and an image processing end. The processing end is located inside a PC end of a control assembly. The X-ray source assembly is used in a scanning device, and the image detector is used for collecting an image and uploading the image to the PC end for image processing and analysis, to obtain a thickness of dry ice to be detected by image preprocessing, grayscale transformation-graying, Prewitt operator image edge extraction, grayscale transformation-binarization, feature extraction, and other methods.

In step S02, the controlling the annular scraper 9 and the stirring device 13 to operate by the PC end to recycle the dry ice specifically comprises:

externally connecting the annular scraper 9 to the scraper driving motor, and setting a high-power working condition and a low-power working condition for the scraper driving motor, wherein a power of the high-power working condition is 500 W to 600 W, and a power of the low-power working condition is 200 W to 300 W;

controlling the annular scraper 9 to cooperatively operate with the externally connected X-ray photogrammetry system by the PC end, which specifically comprises:

sensing that the nozzle motor is operating by the PC end during cleaning when the X-ray photogrammetry system monitors that the thickness of dry ice on the condenser wall 11 is greater than and equal to 4 mm, outputting a feedback signal B to the PC end, and controlling the scraper driving motor to drive the annular scraper 9 to scrape the dry ice in the high-power working condition, thus cleaning the dry ice attached to the condenser wall 11; and sensing that operation of the nozzle motor is ended by the PC end after cleaning, when the X-ray photogrammetry system monitors that the thickness of dry ice is greater than and equal to 2 mm, outputting a feedback signal S to the PC end, and controlling the scraper driving motor to drive the annular scraper 9 to scrape the dry ice in the low-power working condition; and controlling the stirring device 13 to cooperatively operate with the externally connected X-ray photogrammetry system by the PC end, which specifically comprises:

when the X-ray photogrammetry system monitors that the thickness of dry ice at the stirring device 13 is greater than and equal to 50 mm, outputting a feedback signal F to the PC end, controlling the stirring motor to drive the stirring device 13 to stir automatically by the PC end, reducing a diameter of particles of the dry ice to 0.5 mm to 2 mm under the monitoring of the X-ray photogrammetry system, and when the operation of the stirring blade of the stirring device is stopped, taking out the particles of the dry ice from the bottom portion of the dry ice recycling device for recycling.

The above descriptions are merely the embodiments of the present application, and are not intended to limit the present invention. Any modification, equivalent substitution, improvement, and the like made within the scope of application of the present invention are included in the scope of protection of the present invention.

What is claimed is:

1. A dry ice cleaning and recycling device for a connecting rod, comprising a dry ice ejector module, a clamping module and a box (4), the dry ice ejector module and the clamp module being both arranged in the box (4), wherein:

the dry ice ejector module comprises a spray gun guide rail (1) and a cleaning nozzle (2) vertically and slidably connected to the spray gun guide rail (1), and the clamp module comprises a clamp guide rail (5) and a clamp (6) horizontally and slidably connected to the clamp guide rail (5); and a dry ice recycling device is further comprised, wherein the dry ice recycling device comprises a dry ice recycling collector (10) and a condenser pipe (7), and two ends of the condenser pipe (7) are communicated with the box (4), and the dry ice recycling collector (10) respectively, wherein the clamp guide rail (5) of the clamp module is horizontally arranged; an upper end of the clamp (6) is slidably connected below the clamp guide rail (5) through a vertical connecting rod (601), and the clamp (6) is provided with a big-head horizontal bar clamp (602) close to the upper end and a small-head horizontal bar clamp (603) close to a lower end, and the clamp (6) is capable of positioning and placing a plurality of connecting rods (14) at the same time through the big-head horizontal bar clamp (602) and the small-head horizontal bar clamp (603).

2. The dry ice cleaning and recycling device for the connecting rod according to claim 1, wherein the dry ice ejector module is provided with a plurality of spray gun guide rails (1) and a plurality of cleaning nozzles (2), the plurality of spray gun guide rails (1) are vertically arranged side by side, the plurality of cleaning nozzles (2) are fixedly connected to a horizontal connecting rod (201) at intervals, and the horizontal connecting rod (201) is slidably connected to the plurality of spray gun guide rails (1), and the cleaning nozzles (2) are externally connected to a dry ice supply device.

3. The dry ice cleaning and recycling device for the connecting rod according to claim 1, wherein two dry ice ejector modules are provided, and respectively arranged on two sides of the clamp module; the cleaning nozzles (2) of the two dry ice ejector modules are all inclined downwardly at an angle of 30 degrees to 50 degrees with a horizontal plane; and a crumb tray (3) is arranged at a bottom portion of the box (4).

4. The dry ice cleaning and recycling device for the connecting rod according to claim 1, wherein the dry ice recycling collector (10) has a cylindrical structure, and comprises a condenser wall (11), an annular scraper (9) and a stirring device (13); the annular scraper (9) is arranged at a top portion of the condenser wall (11) and externally connected to a scraper driving motor, and the scraper driving motor is capable of driving the annular scraper (9) to move up and down along the condenser wall (11), and the stirring device (13) is arranged at a bottom portion of the condenser wall (11) and externally connected to a stirring motor, and the stirring motor is capable of driving the stirring device (13) to rotate and stir.

5. The dry ice cleaning and recycling device for the connecting rod according to claim 4, wherein a constant-temperature pipe sleeve (8) is sheathed outside the condenser pipe (7); and a constant-temperature sleeve (12) is arranged at a periphery of the condenser wall (11).

6. The dry ice cleaning and recycling device for the connecting rod according to claim 4, wherein the annular scraper (9) is externally connected to an X-ray photogrammetry system and used for monitoring the thickness of dry ice on the condenser wall (11), and the stirring device (13) is also externally connected to the X-ray photogrammetry system, and used for monitoring a thickness of dry ice and granularity of dry ice at the stirring device (13); and the X-ray photogrammetry system comprises a high-voltage generator, an X-ray source assembly, an image detector, and an image processing end; the processing end is located inside a PC end of a control assembly, and the X-ray source assembly is used in a scanning device, and the image detector is used for collecting an image and uploading the image to the PC end for image processing and analysis, to obtain a thickness of dry ice to be detected.

7. A dry ice cleaning and recycling method for a connecting rod, using the dry ice cleaning and recycling device for the connecting rod according to claim 1, wherein the dry ice cleaning and recycling device for the connecting rod comprises the PC end of the control assembly, and the method specifically comprises the following steps of:

step S01: vertically placing the plurality of connecting rods (14) in the clamp (6), clamping big-head ends of the connecting rods through the big-head horizontal bar clamp (602), and clamping small-head ends of the connecting rods through the small-head horizontal bar clamp (603), so that the connecting rods (14) are fixed;

step S02: starting and cooperatively controlling the operation of the following components in sequence by the PC end:

starting the dry ice ejector modules on two sides of the clamp module, and carrying out dry ice cleaning on the connecting rods (14) on the clamp (6) by the cleaning nozzles (2) inclined downwardly at the angle of 30 degrees to 50 degrees with the horizontal plane;

starting a nozzle motor to drive the cleaning nozzles (2) to vertically reciprocate on the spray gun guide rail (1) along a Z-axis direction;

starting a clamp motor to drive the clamp (6) to horizontally reciprocate on the clamp guide rail (5) along a Y-axis direction; and starting the dry ice recycling device and the X-ray photogrammetry system to monitor the thicknesses of dry ice at the condenser wall (11) and the stirring device (13) in real time, feeding back monitoring signals to the PC end and controlling the annular scraper (9) and the stirring device (13) to operate by the PC end to recycle the dry ice; and step S03: shutting down the dry ice ejector module, the nozzle motor, the clamp motor, the dry ice recycling device, and the X-ray photogrammetry system in sequence after cleaning; and removing the connecting rods (14), so that one cleaning process is completed.

8. The dry ice cleaning and recycling method for the connecting rod according to claim 7, wherein the X-ray photogrammetry system comprises the high-voltage generator, the X-ray source assembly, the image detector and the image processing end; the processing end is located inside the PC end of the control assembly; and the X-ray source assembly is used in the scanning device, and the image detector is used for collecting an image and uploading the image to the PC end for image processing and analysis, so as to obtain the thickness of dry ice to be detected.

9. The dry ice cleaning and recycling method for the connecting rod according to claim 7, wherein, in step S02, the controlling the annular scraper (9) and the stirring device (13) to operate by the PC end to recycle the dry ice specifically comprises:

externally connecting the annular scraper (9) to the scraper driving motor, and setting a high-power working condition and a low-power working condition for the scraper driving motor, wherein a power of the high-power working condition is 500 W to 600 W, and a power of the low-power working condition is 200 W to 300 W;

controlling the annular scraper (9) to cooperatively operate with the externally connected X-ray photogrammetry system by the PC end, which specifically comprises:

sensing that the nozzle motor is operating by the PC end during cleaning, when the X-ray photogrammetry system monitors that the thickness of dry ice on the condenser wall (11) is greater than and equal to 4 mm, outputting a feedback signal B to the PC end, and controlling the scraper driving motor to drive the annular scraper (9) to scrape the dry ice in the high-power working condition, thus cleaning the dry ice attached to the condenser wall (11); and sensing that operation of the nozzle motor is ended by the PC end after cleaning, when the X-ray photogrammetry system monitors that the thickness of dry ice is greater than and equal to 2 mm, outputting a feedback signal S to the PC end, and controlling the scraper driving motor to drive the annular scraper (9) to scrape the dry ice in the low-power working condition; and controlling the stirring device (13) to cooperatively operate with the externally connected X-ray photogrammetry system by the PC end, which specifically comprises:

when the X-ray photogrammetry system monitors that the thickness of dry ice at the stirring device (13) is greater than and equal to 50 mm, outputting a feedback signal F to the PC end, controlling the stirring motor to drive the stirring device (13) to stir automatically by the PC end, reducing a diameter of particles of the dry ice to 0.5 mm to 2 mm under the monitoring of the X-ray photogrammetry system, and when the operation of the stirring device is stopped, taking out the particles of the dry ice from the bottom portion of the dry ice recycling device for recycling.

\* \* \* \* \*